United States Patent [19]
Jackson

[11] 3,834,674
[45] Sept. 10, 1974

[54] AERIAL BLOCKS
[75] Inventor: Richard L. Jackson, Lewisburg, Ohio
[73] Assignee: Jackson Communication Corporation, Brokville, Ohio
[22] Filed: Dec. 4, 1972
[21] Appl. No.: 311,805

[52] U.S. Cl............. 254/190 R, 174/40 R, 248/61, 254/134.3 R, 254/198
[51] Int. Cl............................................. B66d 11/38
[58] Field of Search............ 254/134.3 R, 134.3 PA, 254/190 R, 192, 193, 194, 195, 196, 197, 198; 174/40 R; 248/61; 403/362

[56] References Cited
UNITED STATES PATENTS

| | | | |
|---|---|---|---|
| 2,202,184 | 5/1940 | Berger | 254/190 R |
| 2,244,351 | 6/1941 | Venables | 403/362 |
| 2,786,092 | 3/1957 | Gage | 254/134.3 PA |
| 3,095,471 | 6/1963 | Price | 174/160 |
| 3,098,638 | 7/1963 | McAvley | 284/198 |
| 3,146,994 | 9/1964 | Sherman | 254/134.3 R |
| 3,596,878 | 8/1971 | Parsen | 254/134.3 R |

OTHER PUBLICATIONS
Model MH303, Spacer Type Aerial Cable Stringing Block; Sherman and Riley Catalogue, Section 3, pages 4–5.

*Primary Examiner*—Richard A. Schacher
*Assistant Examiner*—Jeffrey V. Nase
*Attorney, Agent, or Firm*—Biebe, French & Bugg

[57] ABSTRACT

An aerial block for stringing cable from an existing supporting strand includes a casting forming a main frame having a pair of strand engaging hooks at its upper end and a downwardly depending central portion. The downwardly depending central portion has a series of vertically spaced openings formed through it which slidably receive a series of substantially identical, horizontally extending rods. Alternate rods beginning with the lowermost rod have a series of grooved sheaves rotatably mounted on them while the remaining rods serve as keeper rods and project in overlying relationship to the sheaves to prevent cable supported by the sheaves from being inadvertently displaced from them. Each of the rods has means frictionally engaging it to permit the rods to be fixed within the center frame at some preselected position.

8 Claims, 7 Drawing Figures

AERIAL BLOCKS

BACKGROUND OF THE INVENTION

In the stringing of cable from an existing supporting strand, commonly referred to as a messenger, it is conventional to install cable stringing blocks on the messenger to support the cable as it is positioned beneath the messenger for subsequent lashing thereto. An example of an aerial type cable stringing block is that manufactured by Sherman and Riley, Inc., Model MH303, SPACER TYPE AERIAL CABLE STRINGING BLOCK, shown in their catalogue in Section 3, Pages 4 and 5. With this type of aerial block a single hook at the top is installed over the messenger and the cables are received on grooved sheaves mounted beneath the strand engaging hook. While a block of this type does provide some flexibility in that it can be inverted to change the arrangement of the cables carried thereby, its flexibility is limited beyond this.

SUMMARY OF THE INVENTION

A cable block in accordance with the present invention includes a casting forming a main frame which includes a pair of strand engaging hooks at its upper end and a series of passages through its depending central portion which slidably receives alternate keeper and axle rods of substantially identical configuration.

The axle rods rotatably mount grooved sheaves which receive the cable being installed while the keeper rods extend over the sheaves and serve to retain cables in position in the grooves formed in the sheaves.

Because the axle and keeper rods are of substantially identical construction they may be interchanged as desired, facilitating both manufacture and repair. As noted above, each of the rods is slidably received in passages formed through the main frame. As a result, the proportion of each of the axle rods that projects from each side of the main frame, and, consequently, the number and arrangement of sheaves positioned on opposite sides of the main frame, may be varied greatly.

To lock each of the axle rods in a desired position, threaded openings are formed in the main frame, intersecting the axle rod-receiving passages and set screws are received threadably in these openings to engage frictionally the axle rods.

While the keeper rods may, if desired, be retained in position in the same manner as the axle rods, it will generally be desirable to permit sliding movement of the keeper rods in their respective passages without adjustment of set screws. Therefore, the keeper rods are provided with means frictionally engaging them, yet permitting slidable movement thereof.

This is done by forming openings in the frame intersecting the keeper rod-receiving passages and either positioning a plug of polymeric material, such as Teflon, in the opening and pressing it into engagement with the keeper rod by means of a set screw, or by installing spring loaded balls or plungers in the openings which are urged resiliently into contact with the keeper rods.

To facilitate removal and replacement of sheaves on the axle rods, as well as removal and installation of both the keeper and axle rods, whle preventing inadvertent removal of the rods from the main frame, each end of each of the rods is provided with removable stop means. This may conveniently take the form of an annular groove machined in each rod adjacent each of its ends and receiving a resilient split ring or washer which projects outwardly of the rod and engages the frame adjacent the openings therethrough.

DESCRIPTION OF THE PREFERRED EMBODIMENTS

Figure 1:
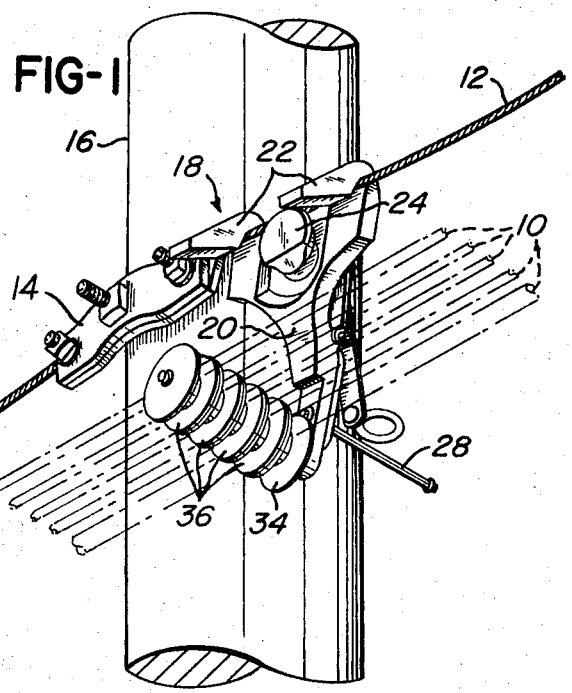
FIG. 1 is a perspective view showing one form of block in accordance with the present invention attached to a supporting strand.

As seen in FIG. 1, in installing cable 10, such as coaxial cable, a supporting strand or messenger 12 is clamped by means of a clamp 14 to a pole 16 and the coaxial cable thereafter strung beneath the strand 12 by subsequent, permanent lashing. To position the cable 10 with respect to the strand 12 prior to lashing a series of aerial blocks 18 in accordance with the present invention are provided.

Figure 3:
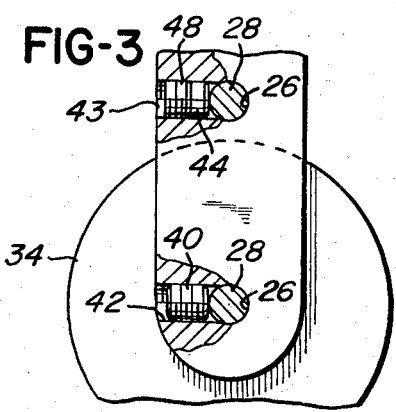
FIG. 3 is a view taken on line 3—3 of FIG. 2.

Blocks 18 may be formed as castings each having a central depending portion or main frame 20 and a pair of strand engaging hooks 22 positioned above the main frame 20. Additionally, a rotatable cam 24 of conventional design may be provided to cooperate with the hooks 22 and prevent movement of the block 18 along the strand 12. In accordance with the present invention, and as best seen in FIG. 3, member 20 is provided with passages 26 therethrough which are of substantially equal diameter and extend in vertically spaced, parallel relationship to each other and perpendicular with respect to the strand 12 engaged by the hooks 22.

Figure 7:
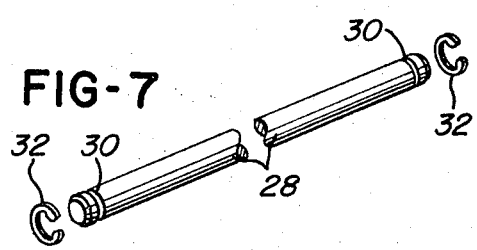
FIG. 7 is an exploded perspective view of a rod and stop members.

Both of the passages 26 slidably receive rods 28 of substantially identical construction, and, as best seen in FIG. 7, each of the rods has machined therin adjacent each of its ends an annular groove 30 which receives a split ring 32 which projects outwardly of the rod and forms a stop member. The lowermost rod has rotatably mounted thereon a plurality of sheaves 34 and 36, each of which is provided with a substantially semi-circular groove, as at 38, extending about its periphery to receive a cable 10.

Figure 2:
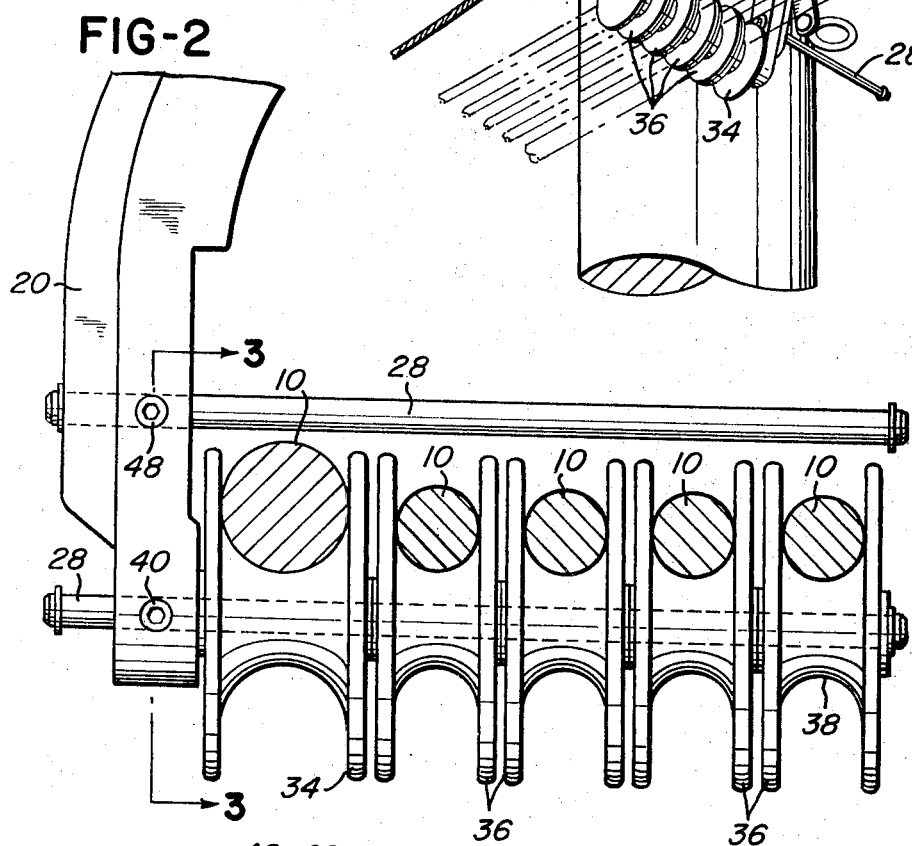
FIG. 2 is an enlarged view of a portion of the block of FIG. 1.

The particular size of sheave mounted on the axle rod 28 will depend upon the size cable being installed. In FIG. 2, for example, it will be noted that the sheave 34 is substantially larger than the four other sheaves 36. In accordance with a feature of the present invention, the size and positioning of these sheaves can be varied as desired for a particular installation.

The upper rod 28 serves as a keeper rod and, after the cables 10 have been installed, it is extended outwardly in overlying relationship to the sheaves 34 and 36, as shown in FIG. 2, to retain cables received therein against inadvertent displacement. When it is desired to remove a cable from a sheave or sheaves the keeper rod 28 is merely slid within its passage 26 to the position shown in FIG. 1 to clear the sheaves and provide access thereto.

Similarly, the arrangement and spacing of sheaves on the axle rod 28 can also be varied by simply removing the split ring 32 from the end thereof to allow sheaves to be added or removed. Additionally, if it is desired to position sheaves on both sides of the main frame 20, it will be apparent that the axle rod 28 may be shifted longitudinally thereof so that portions thereof project from opposite sides of the frame.

To fix the axle rod 28 in the desired position with respect to the frame 20, a set screw 40 is threadably received in an opening 42 which intersects the passage 26. Thus, the set screw 40 may be threaded into frictional engagement with the axle rod 28 after it has been adjusted as desired to fix it in the desired position.

With regard to the keeper rod 28, means are preferably provided for frictionally engaging this rod while still permitting movement of the rod within its passages 26. In this regard, an opening 43 is formed in the frame 20 intersecting the frame 20 and a plug of polymeric material 44 of Teflon or the like, is received in the opening and pushed against the keeper rod 28 by means of a set screw or the like 48. Alternately, and as will be explained in connection with a second preferred embodiment of the invention, a spring loaded plunger or ball may be received in the opening 43 for engagement with the keeper rod.

Figure 4:
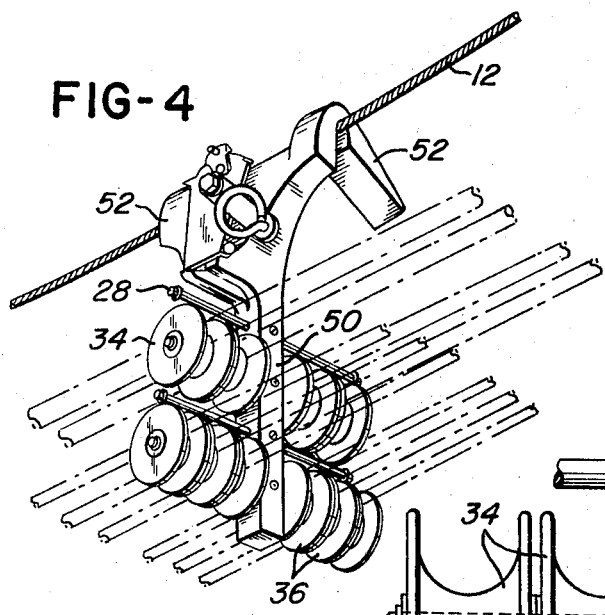
FIG. 4 is a perspective view of a second preferred embodiment of the present invention.
Figure 5:
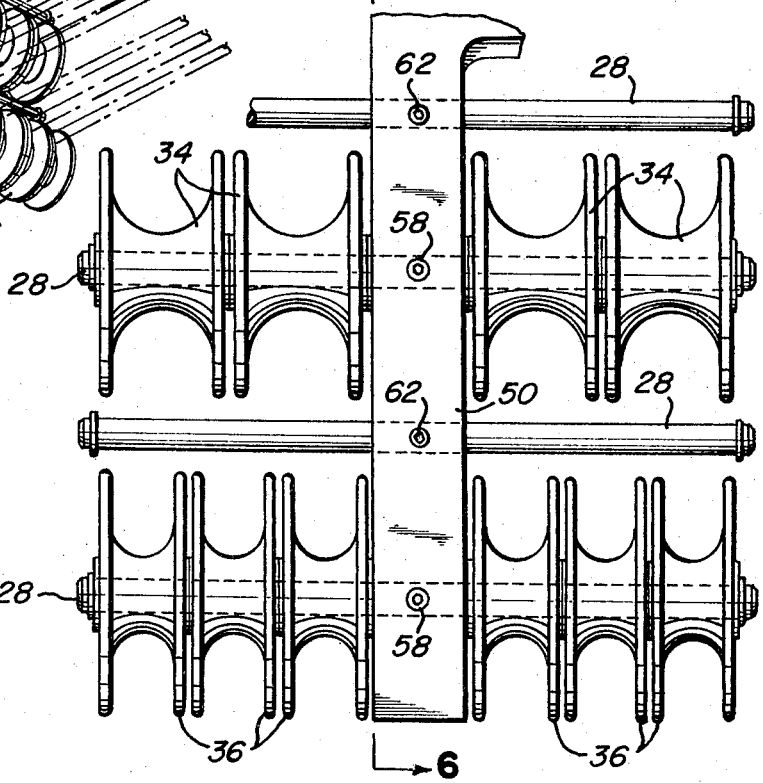
FIG. 5 is an enlarged view of a portion of the block of FIG. 4.

Turning now to FIGS. 4 through 7 of the drawings, a second preferred embodiment of the invention will be described. As seen in FIGS. 4, a casting is provided with a centrally depending main frame 50 and a pair of hooks 52 which are received over a supporting strand 12. A locking device may also be provided for preventing inadvertent movement of the frame along the strand 12 as in the embodiment shown in FIG. 1.

In the embodiment of FIGS. 4–7, however, it will be seen that the central portion 50 is substantially longer than the central portion 20 and has formed therethrough a plurality of passages 54 of substantially equal diameter extending in vertically spaced, parallel relationship to each other and perpendicular to the strand 12 engaged by the hooks 52. In each of the passages 54 a substantially identical rod 28 is slidably received, the rods 28 being of the same configuration as those described in connection with the embodiment shown in FIG. 2.

Figure 6:
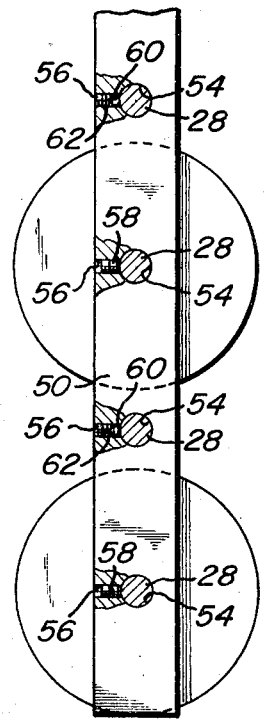
FIG. 6 is a view taken on line 6—6 of FIG. 5.

A threaded opening 56 is formed in intersecting relationship to each of the passages 54 and the bottommost and alternate openings thereabove threadably receive set screws 58 similar to the set screws 40. The remaining openings 56 contain spring loaded balls or plungers 60 which are resiliently urged to the right as seen in FIG. 6 by springs or the like, not shown, received in hollow set screws 62. Alternately, the plug and set screw construction 44, 48 of FIG. 3 may be used.

Regardless of which specific construction is used, it will be seen that the axle rods 28 carrying rollers 34 and 36 may be locked in position by the frictional engagement of the set screw with the axle rods while the keeper rods 28 are frictionally engaged but yet are permitted sliding movement within their respective passages. Thus, the position of the axle rods 28 within their passages may be adjusted to provide the desired arrangement of sheaves and the axle rods then fixed in the adjusted position while the keeper rods 28 may be not only adjusted to the configuration of the sheaves with which they cooperate but are also readily moved out of position to permit cables to be added or removed from the sheaves 34 and 36.

From the above it will be seen that the present invention provides aerial stringing blocks which permit simultaneous installation of several cables assembled in any desired configuration and with provision for ready removal or placement of the cables in the cable supporting sheaves.

While the forms of apparatus herein described constitute preferred embodiments of the invention, it is to be understood that the invention is not limited to these precise forms of apparatus, and that changes may be made therein without departing from the scope of the invention.

What is claimed is:

1. An aerial block comprising:
   a. a frame including an upper, strand engaging portion and a downwardly depending central portion,
   b. means defining a plurality of substantially identical, vertically spaced passages extending through said central portion of said frame in substantially parallel relationship to each other,
   c. substantially identical rod means slidably received in said passages, extending in spaced, substantially parallel relationship to each other and constituting alternate axle and keeper rod means,
   d. a plurality of grooved sheaves rotatably mounted on said axle rod means,
   e. said keeper rod means extending in overlying relationship to said sheaves to prevent cables received in said sheaves from being displaced therefrom, and
   f. means mounted in said central portion and frictionally engaging said rod means for adjustably fixing the positions of said rod means in said passages.

2. The block of claim 1 further comprising:
   a. means defining stop members mounted on opposite ends of said axle and keeper rod means and preventing removal thereof from said passages in said base frame.

3. The block of claim 2 wherein said stop means comprises:
   a. means defining a groove extending about the periphery of said axle and keeper rod means adjacent each end thereof, and
   b. a resilient split ring received in each of said grooves and projecting outwardly beyond the surface of said axle keeper rod means.

4. The block of claim 1 wherein said means for adjustably fixing the positions of said rod means comprises:
   a. means defining openings in said base frame intersecting said passages, and
   b. means received in said openings and frictionally engaging said axle and keeper rod means.

5. The block of claim 4 wherein said frictionally engaging means comprises:
   a. screw means threadably received in one of said openings and frictionally engaging said axle rod means.

6. The block of claim 4 wherein said frictionally engaging means comprises:

a. a plug of polymeric material received in one of said openings and engaging said keeper rod means, and b. screw means pressing said plug into engagement with said keeper rod means.

7. The block of claim 4 wherein said frictionally engaging means comprises:
   a. a spring loaded member resiliently urged into engagement with said keeper rod means.

8. An aerial block comprising:
   a. a casting forming a base frame having a pair of supporting strand engaging hooks adjacent an upper end thereof,
   b. cam means rotatably mounted on said casting and selectively cooperating with said hooks to lock said frame against movement along a supporting strand engaged by said hooks,
   c. means defining a plurality of passages of approximately the same diameter extending through said frame in spaced parallel relationship to each other and extending substantially perpendicular to a supporting strand engaged by said hooks,
   d. a plurality of substantially identical rods slidably received in said passages,
   e. each of said rods having means defining a groove extending about said rods adjacent each end thereof,
   f. a resilient split locking ring received in each of said grooves and projecting outwardly beyond the surfaces of the rods with which they are associated,
   g. said rings having an outer diameter greater than the diameter of said passages to prevent said rods from being inadvertently removed from said openings,
   h. alternate ones of said rods beginning with the lowermost rod serving as axle rods,
   i. each of said axle rods having mounted thereon a plurality of sheaves having means defining substantially semicircular cable receiving grooves extending about the periphery thereof,
   j. the remainder of said rods serving as keeper rods and extending in overlying relationship to the sheaves mounted on the axle rod positioned below each keeper rod,
   k. means defining openings in said base frame intersecting each of said passages,
   l. a plug of polymeric material received in each opening intersecting a keeper rod-receiving passage,
   m. a set screw threadably received in each of the openings containing one of said plugs and pressing said plug into engagement with said keeper rods, and
   n. a set screw received in each of said openings intersecting an axle rod-receiving passage and frictionally engaging said axle rods.

* * * * *